United States Patent
Kawada et al.

[15] 3,656,043
[45] Apr. 11, 1972

[54] STEERING SYSTEM WITH AUTOMATIC INCREASE OF RATE TIME

[72] Inventors: Shin-ichi Kawada, Yokohama; Yoichi Hirokawa, Kamakura; Isao Masuzawa, Tokyo, all of Japan

[73] Assignee: Kabushikikaisha Tokyo Keika Seizosho (Tokyo Keiki Seizosho Co., Ltd.), Tokyo, Japan

[22] Filed: Feb. 2, 1970

[21] Appl. No.: 7,631

[30] Foreign Application Priority Data

Feb. 8, 1969 Japan..................................44/9388
Feb. 8, 1969 Japan..................................44/9389

[52] U.S. Cl...............................318/588, 318/610, 318/621, 235/150.1, 235/150.2, 235/183, 328/171
[51] Int. Cl...........................................G05b 11/14
[58] Field of Search............235/183, 150.2, 150.22–150.26, 235/150.1; 307/229, 237, 318, 261; 328/142–145, 171; 318/560, 561, 566, 588, 610, 611, 616, 617, 621, 624

[56] References Cited

UNITED STATES PATENTS

| | | | |
|---|---|---|---|
| 2,939,066 | 5/1960 | Crenshaw | 318/617 |
| 3,505,577 | 4/1970 | Hirokawa | 318/561 |
| 3,296,520 | 1/1967 | Griffith | 307/237 |
| 3,028,534 | 4/1962 | Chilton | 318/617 |
| 3,105,928 | 10/1963 | Congleton et al | 318/617 |
| 3,227,935 | 1/1966 | Kawada | 318/610 |
| 3,270,344 | 8/1966 | Righton | 318/617 |
| 3,299,293 | 1/1967 | Knapp-Ziller | 307/261 |
| 3,431,475 | 4/1969 | Wesner | 318/624 |

*Primary Examiner*—Felix D. Gruber
*Attorney*—Hill, Sherman, Meroni, Gross & Simpson

[57] ABSTRACT

An automotive steering system including means for producing a commanded course change which is the difference between the preset course and a desired course and including an operational unit capable of accomplishing proportional and differential control and having rate feedback and in which a position feedback signal is applied to the input of the operational unit through a circuit which has a dead zone feature such that when the position feedback signal exceeds a predetermined level the time constant of the operational unit is changes so as to prevent over-shoot of the autopilot when making large corrections.

5 Claims, 9 Drawing Figures

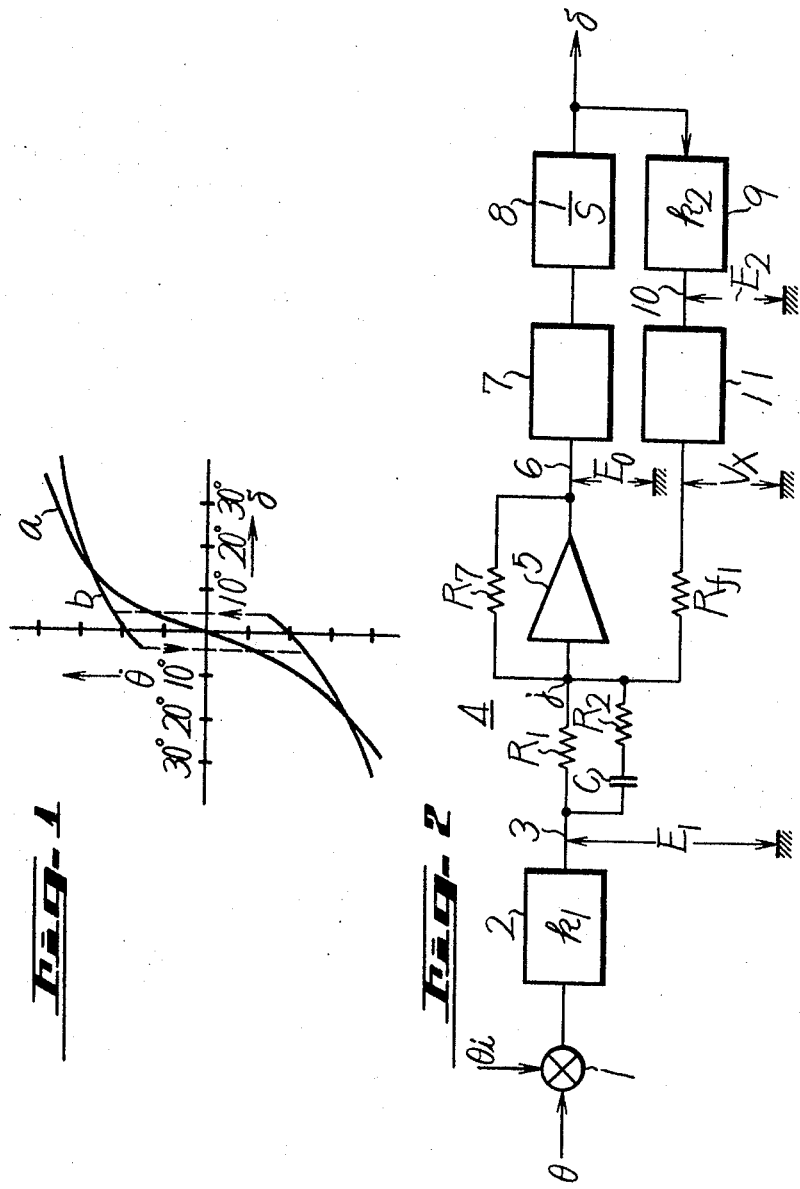

Patented April 11, 1972

INVENTORS
SHIN-ICHI KAWADA
YOICHI HIROKAWA
ISAO MASUZAWA

BY *Hill, Sherman, Meroni, Gross & Simpson*
ATTORNEYS

Patented April 11, 1972

INVENTORS
SHIN-ICHI KAWADA
YOICHI HIROKAWA
ISAO MASUZAWA
BY *Hill, Sherman, Meroni, Gross & Simpson*
ATTORNEYS

STEERING SYSTEM WITH AUTOMATIC INCREASE OF RATE TIME

BACKGROUND OF THE INVENTION

1. Field of the Invention

This invention relates to an automatic steering system, and more particularly to a marine automatic steering system which is of particular utility when employed in giant vessels such as super tankers.

2. Description of the Prior Art

Marine automatic steering devices have been used for a long time. Automatic steering devices for giant vessels now in use usually perform proportional and differential operations. With the use of such automatic steering devices, giant vessels can be accurately controlled to maintain set courses but such equipment does not control, the vessels accurately to a newly-set course. When giant vessels deviate from their set courses dangers such as collision with other ships, or reefs or the like arise. Such a deviation from the course is caused mainly by the steady-state turning characteristic of the ship. When turning a giant vessel of about 100,000 to 400,000 dead weight tons (DWT) (almost all of which are oil tankers), even if the rudder angle is small, the steady-state turning angular velocity of the ship is much higher than would be expected and the relationship between the steady-state turning angular velocity and the rudder angle is non-linear.

SUMMARY OF THE INVENTION

One object of this invention is to provide a marine automatic steering system which is capable of effecting usual proportional and differential operations for maintaining a set course of a ship and automatically intensifying the rate operation in the case of an automatic course change thereby to ensure prevention of over-shoot of the ship from a newly-set course.

Another object of this invention is to provide a marine automatic steering system which prevents deviation of the above giant vessel from its course in the event of an automatic course change so as to prevent collisions or like accidents.

Other objects, features and advantages of this invention will become apparent from the following description taken in conjunction with the accompanying drawings.

BRIEF DESCRIPTION OF THE DRAWINGS

FIG. 1 is a graph showing the steady-state turning characteristic of a giant vessel which is one example of an object to be controlled by the system of this invention;

FIG. 2 is a block diagram of one example of an automatic steering system, for explaining the principles of the present invention;

DESCRIPTION OF THE PREFERRED EMBODIMENTS

Figure 3:
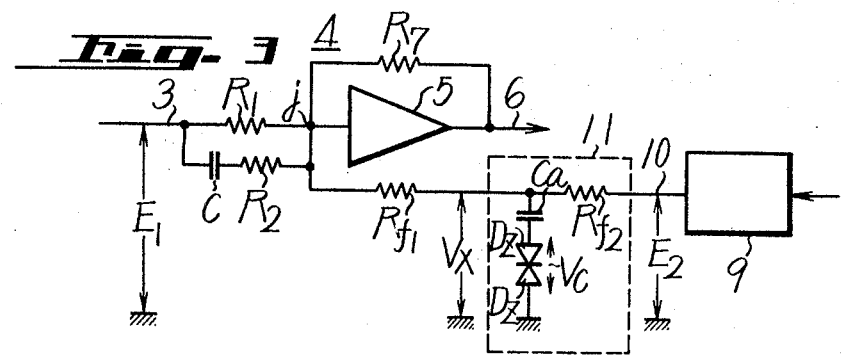
FIG. 3 is a connection diagram showing one embodiment of this invention.

With reference to FIG. 1 a description will be given first of the turning characteristics of a huge vessel so as to facilitate a better understanding of the principles of this invention. Generally, the relation between rudder angle $\delta$ and the turning angular velocity $\dot{\theta}$ of the giant vessel obtained by spiral or reverse spiral tests, has a characteristic as indicated by the curve $a$ in FIG. 1. The turning angular velocity $\dot{\theta}$ is representative of a value when the ship is turning under steady-state conditions (while the ship is turning with a constant radius under steady-state conditions). When the course of a giant vessel, is changed automatically and the angle of the course change is large the vessel will turn at substantially the steady-state rate before reaching the newly-set course, and the turning angular velocity $\dot{\theta}$ is indicated by curve $a$ in FIG. 1. When a course change of less than several degrees or when a set course is maintained with an automatic steering system, the ship does not turn at steady-state rate and the turning velocity of the ship is suprisingly low. It is thought that the ship is subject to a transient phenomenon in the latter case. Thus, the turning characteristics of the ship are different in the former and latter cases. Accordingly, when the course is changed by a large angle by the automatic steering system in a system in which the rate time is set for suitable automatic maintenance of the set course, the ship will over-shoot the newly-set course by a large amount. Especially is this true as to a ship which has such hysteresis between $\theta$ and $\delta$ as indicated by the curve $b$ in FIG. 1. If the rate time is selected to be suitable for large course change, the rate time will be too long for the maintenance of the set course and the steering device will be too sensitive and will over-respond to external disturbances such as waves, winds and gimballing errors produced by a compass device. These factors will cause an unnecessary increase in the number of steering operations and hence result in abuse of the steering device.

To avoid this, the rate time is automatically varied with a deviation $\Delta\theta$ (between a set source $\theta i$ and the actual ship's heading $\theta$) and the turning angular velocity $\dot{\theta}$. It is not practical to continuously vary the rate time as a function of the deviation $\Delta\theta$ and the turning angular velocity $\dot{\theta}$, because such device is too complicated and expensive.

The present invention comprises a system in which the rate time is $T_1$ and $T_1 + T_a$, respectively, under the conditions of the following equations (1) and (2) and the invention resides in a system in which it is possible to readily, positively and cheaply achieve the variations of the rate time in a non-linear manner.

$$|\Delta\theta + T_R\dot{\theta}| \leq K_R \tag{1}$$

$$|\Delta\theta + T_R\dot{\theta}| > K_R \tag{2}$$

where $T_R$ is a constant and $K_R$ is a value determined by the ship and her sailing conditions.

A description will be given of one example of determination of the above constants $T_R$ and $K_R$. Assuming that $K_R$ is 5°, that $T_R$ is 30 seconds and that the turning angular velocity $\dot{\theta}$ of a giant vessel is 0.1° per second, $T_R\dot{\theta}$ is 3° and when $\Delta\theta$ is about 2°, $|\Delta\theta + T_R\dot{\theta}|$ is more than $(2° + 3°) = 5°$, satisfying the equation (2). Accordingly, the desired rate time is $T_1 + T_a$ in this case.

When the ship advances in a straight course, that is, when the turning angular velocity $\dot{\theta}$ is substantially zero, the above numerical values satisfies the equation (1), so that the rate time fulfills the equation (1) and is $T_1$.

In all of the cases where the ship has begun steady-state turning and her turning angular velocity $\dot{\theta}$ has reached a large value in comparison with the amount of the rudder angle $\delta$ as represented by the curves $a$ or $b$ in FIG. 1, and where the deviation $\Delta\theta$ has been increased by varying the set course $\theta i$ in the event of an automatic course change and where both the turning angular velocity $\dot{\theta}$ and the deviation $\Delta\theta$ are great, the above equation (2) is satisfied and the rate time of the automatic steering system increases up to $T_1 + T_a$ which will prevent over-shooting of the ship of the commanded course.

FIG. 2 is an example of the automatic steering system which effects proportional and differential operations; $\theta i$ is representative of a set course of a ship, and $\theta$ the ship's actual heading which is detected by a gyrocompass or magnetic compass. The set course $\theta i$ and the actual ship's heading $\theta$ are compared with each other in an adder 1 and the resulting deviation $\Delta\theta$ between them is converted by an angular signal generator 2 into a DC electric voltage $E_1$ at line 3. Since mechanisms for generating the set course $\theta i$ and the actual ship's heading $\theta$ and adding them are well known, a detailed description of them will be given. In ships using a gyrocompass, a step motor or a synchro is usually employed for transmitting the actual ship's heading $\theta$ to the automatic steering device. In a typical system the set course $\theta i$ is given by a dial card and graduations and a shaft for transmitting the angle $\theta i$ is coupled through a differential gear with a shaft for transmitting the ship's heading $\theta$. The shaft for transmitting the ship's heading $\theta$ is driven by the synchro or step motor, and the differential output of the shaft is applied to a potentiometer in which a DC signal is produced. In such systems the adder 1 is a differential gear and the angular signal generator 2 is a potentiometer. The angular signal generator 2 may also comprise a synchro and a demodulator.

The voltage fed to the line 3 is proportional to the deviation or heading error, that is, $\theta i - \theta = \Delta\theta$. In FIG. 2 reference numeral 4 indicates generally an operational unit which consists of resistors $R_1$, $R_2$, $R_7$, $Rf_1$, a capacitor C and an operational amplifier 5 having a gain of about $10^6$. Reference numeral 7 designates a controller, which is supplied with the output of the operational unit 4 through a line 6. The controller 7 controls a power unit 8 and may be, for example, an amplifier performing the function of a relay and a solenoid value. The power unit 8 may be, for instance, a hydraulic power unit consisting of a piston and a cylinder. Since the devices 7 and 8 are not directly related to this invention, a detailed description will not be given. The unit 8 also may be a motor-type power unit.

A rudder order angle $\delta$ is produced by the power unit 8 and is simultaneously converted by a signal converter 9 into an electric signal and is then fed to the resistor $Rf_1$ of the operational unit 4 through a line 10 and a circuit 11, thereafter being applied to the input side of the operational amplifier 5. The signal converter 9, the line 10, the circuit 11 and the resistor $Rf_1$ constitute a feedback loop.

A brief description will be given of the operation of the automatic steering device shown in FIG. 2. If a difference exists between the set course $\theta i$ and the actual ship's heading $\theta$, a voltage $E_1$ is fed to the line 3 through the angular signal generator 2 which is proportional to the deviation $\Delta\theta$. The voltage may be assumed to be $k_1\Delta\theta$, and it is applied as an input to the operational unit 4. The operational unit 4 is constructed by the usual analog computer techniques, and a signal proportional to the deviation $\Delta\theta$ and a signal proportional to rate are both transmitted through the capacitor C and the resistor $R_2$ and are added together and applied to an input terminal $j$ of the operational amplifier 5. Further, the rudder position signal is transmitted through the resistor $Rf_1$ and is also added to the above signals at point $j$ and then applied to the input of the operational amplifier 5. The output signal of the operational amplifier 5 is applied as a negative feedback signal to the input terminal $j$ through the resistor $R_7$, balancing the input signal. Since the gain of the amplifier 5 is very high, the potential at the point $j$ is normally maintained at zero and the output $E_0$ of the amplifier 5 is exactly proportional to the difference between the input transmitted through the elements $R_1$, $R_2$ and C and the rudder angle signal through the resistor $Rf_1$. When the voltage $E_0$ is substantially zero, the controller 7 remains in its neutral position. However, when $E_0$ is not zero, the controller 7 controls and drives the power unit 8 in a direction depending on the polarity until the voltage $E_0$ becomes zero, thus producing the rudder angle $\delta$. Therefore, if the circuit 11 consists of only a resistor, the operational amplifier 5, the controller 7 and the power unit 8 operate in such a manner that the proportional and differential signals of the deviation $\Delta\theta$ applied to the point $j$ and the signal proportional to the rudder angle applied to the point $j$ through the signal converter 9, the circuit 11 and the resistor $Rf_1$ are always equal to but opposite in polarity to each other. Also the resulting rudder angle $\delta$ is always proportional not only to the deviation $\Delta\theta$ but also to its rate of change. Accordingly, the automatic steering system shown in FIG. 2 performs the proportional and differential operations. The rate time (Time constant) $T_1$ is the product $R_1C$ of the resistor $R_1$ and the capacitor C.

In this invention when the gain of the operational amplifier 5 is very high, the voltage at the input terminal $j$ of the amplifier 5 may be considered to be always held at zero by the usual analog computer techniques, so that if the input voltage from the resistor $Rf_1$ is taken as $Vx$, the following equation is obtained.

$$\frac{E_1}{R_1} + \frac{E_1}{R_2 + \frac{1}{CS}} + \frac{Vx}{Rf_1} = 0 \quad (3)$$

With $E_1 = k_1\Delta\theta$, the voltage $Vx$ is derived from the above equation as follows:

$$Vx = -k_1 \frac{Rf_1}{R_1}\left(1 + \frac{R_1 C}{R_2 CS + 1}S\right)\Delta\theta \quad (4)$$

The first term in the bracket of the equation (4) indicates that the voltage $Vx$ is proportional to the deviation $\Delta\theta$ and the second term in the bracket indicates that the voltage $Vx$ is in proportional to the rate value of the deviation $\Delta\theta$. The denominator $R_2CS + 1$ of the second term in the bracket shows that the rate value is equivalent to a value transmitted through a filter having a time constant $R_2C$. Accordingly, if the automatic steering system is designed to increase its rate time only when the voltage $Vx$ exceeds a certain value $Vc$, the rate operation increases under the condition of the equation (2), thus attaining the object of this invention. A comparison of equations (2) and (4) shows that the constant $T_R$ corresponds to $R_1C$.

FIG. 3 illustrates one example of this invention as applied to the automatic steering system of FIG. 2. In FIG. 3 the same reference numerals as those in FIG. 2 indicate the same elements and only the operational unit 4 and the feedback circuit 11 of the system shown in FIG. 2 are illustrated. In the present example the operational unit 4 is identical to the one shown in FIG. 2. The portion indicated by the broken line corresponds to the circuit 11 of FIG. 2 and consists of a resistor $Rf_2$, a capacitor Ca and a pair of Zener diodes Dz. Which are connected in reverse directions to constitute a dead-zone element. If the gain of the signal converter 9 is taken as $k_2$ in this case, the voltage $E_2$ applied to the line 10 is expressed as $k_2\delta$. If, now, the Zener voltage is taken as $Vc$, when $Vx < Vc$, the capacitor Ca cannot be supplied with current because it is blocked by the Zener diodes, with the result that only the resistor $Rf_2$ transmits the signal of the rudder angle $\delta$ to permit the proportional and differential operations of the automatic steering system as previously described in connection with the example of FIG. 2. In this case, the voltage at the point $j$ is zero (because the elements 5, 7 and 8 operate the rudder in a manner to hold the voltage at the point $j$ zero in the example of FIG. 2), so that the transfer function of the automatic steering system of this example is given by the following equation.

$$\frac{E_1}{R_1} + \frac{E_1}{R_2 + \frac{1}{CS}} + \frac{E_2}{Rf_1 + Rf_2} = 0$$

$$\therefore \frac{k_1}{R_1}\left(\frac{R_1 C}{R_2 CS + 1}S + 1\right)\Delta\theta = \frac{-k_2}{Rf_1 + Rf_2}\delta$$

and therefore it follows that $$\delta = -\frac{k_1}{k_2} \cdot \frac{(Rf_1 + Rf_2)}{R_1} \cdot \left(\frac{R_1 C}{R_2 CS + 1}S + 1\right)\Delta\theta \quad (5)$$

It appears from equation (5) that the rudder angle $\delta$ varies with the proportional and differential values of the deviation $\Delta\theta$ and that the rate time is $R_1C$.

When $|Vx|$ exceeds the Zener voltage $Vc$, the capacitor Ca begins to draw charging current which flows through the resistor $Rf_2$ to cause a voltage drop thereacross, so that the voltage applied to the resistor $Rf_1$ is delayed in phase behind that in the case where the capacitor Ca is not charging. The transfer function of the automatic steering system can be approximately given by the following equation when the capacitor Ca is in operation.

$$\frac{E_1}{R_1} + \frac{E_1}{R_2 + \frac{1}{CS}} + \frac{\frac{1}{CaS}E_2}{Rf_1Rf_2 + (Rf_1 + Rf_2)\frac{1}{CaS}} = 0$$

$$\therefore \frac{k_1}{R_1}\left(\frac{R_1C}{R_2CS+1}S+1\right)\Delta\theta$$

$$= -\frac{k_2}{(Rf_1+Rf_2)} \cdot \frac{1}{\frac{Rf_1Rf_2}{Rf_1+Rf_2}CaS+1}\delta$$

Therefore, $$\delta = -\frac{k_1}{k_2} \cdot \frac{(Rf_1+Rf_2)}{R_1}$$
$$\cdot \left(\frac{R_1C}{R_2CS+1}S+1\right)\left(\frac{Rf_1Rf_2}{Rf_1+Rf_2}CaS+1\right)\Delta\theta \quad (6)$$

or $$\delta = -\frac{k_1}{k_2} \cdot \frac{(Rf_1+Rf_2)}{R_1} \cdot \left[\frac{R_1C}{R_2CS+1} \cdot \frac{Rf_1Rf_2}{Rf_1+Rf_2}CaS^2 \right.$$
$$\left. + \left(\frac{R_1C}{R_2CS+1} + \frac{Rf_1Rf_2}{Rf_1+Rf_2}Ca\right)S + 1\right]\Delta\theta \quad (7)$$

A comparison of the equation (7) with the equation (5) will show the following facts. When $|Vx|$ exceeds the Zener voltage Vc, the rate time increases by $Rf_1Rf_2Ca/(Rf_1 + Rf_2)$, by which the object of this invention is attained and also the term of $S^2$ of the equation (2), that is, the angular acceleration control is added to the automatic steering system, thus further assuring that the ship does not over-shoot during an automatic course change.

In accordance with the method above described with FIG. 3, by selecting $R_1C$ to be a value suitable for the maintenance of the set course and by selecting $Rf_1Rf_2Ca/(Rf_1 + Rf_2)$ to prevent over-shooting of the ship during automatic course change, a highly precise control for maintenance of the set course can be achieved with an appropriate number of steering operations and, further, the automatic course change can be controlled so that the ship will not over-shoot. This is due to the rate having a long, rate time and further including angular acceleration control. Further, since this system requires only the capacitor Ca and the Zener diodes Dz in addition to the elements of the example of FIG. 2, the construction of the automatic steering device is simple and economical. Also $K_R$ for determining the conditions of the equation (2) can be easily set to an optimum value by selecting the Zener diodes having the desired voltage Vc.

FIGS. 4 to 8, inclusive, illustrate modified forms of the present invention respectively, in which the same reference numerals as those in the foregoing example indicate the same elements.

Figure 4:
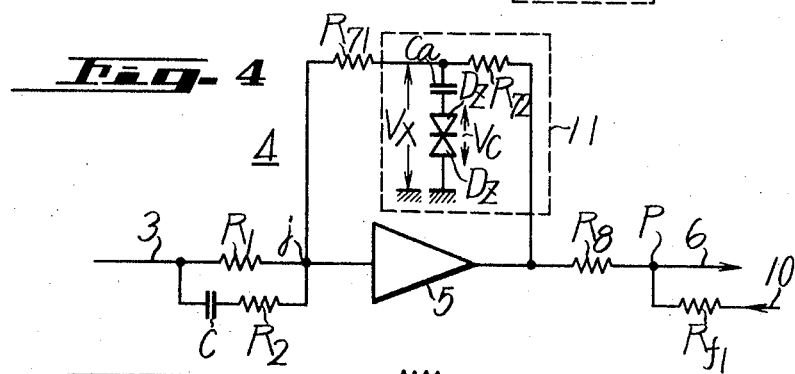
FIGS. 4 to 8 are connection diagrams illustrating modified forms of this invention.

The example depicted in FIG. 4 is different from that of FIG. 3 in the construction of the operational unit 4. Namely, in this example, the rudder angle signal transmitted through the resistor $Rf_1$ is applied not to the input of the operational amplifier 5 but to a point P on its output side. Further, the feedback resistor of the amplifier 5 is made up of resistors $R_{71}$ and $R_{72}$ and a series circuit consisting of the capacitor Ca and the Zener diodes Dz, which are connected between the connection point of the resistors $R_{71}$ and $R_{71}$ and ground. If the voltage at the connection point of the resistors $R_{71}$ and $R_{72}$ is taken as Vx, the following equation is given because the potential at the point $j$ is equal to zero as in the example of FIG. 3.

$$\frac{E_1}{R_1} + \frac{E_2}{R_2+\frac{1}{CS}} + \frac{Vx}{R_{71}} = 0 \quad (8)$$

From a comparison of the above equation (8) with that (3) it appears that the voltage Vx is the same as that obtainable when the resistor $Rf_1$ is substituted with $R_{71}$ in the equation (4)

and that the rate time is increased by the operation of the capacitor Ca depending upon whether $|Vx|$ exceeds the Zener voltage Vc as in the example of FIG. 3. Therefore, it will be understood that the example of FIG. 4 is exactly equivalent to that of FIG. 3 and that the object of this invention can be similarly attained with this circuit.

Figure 5:
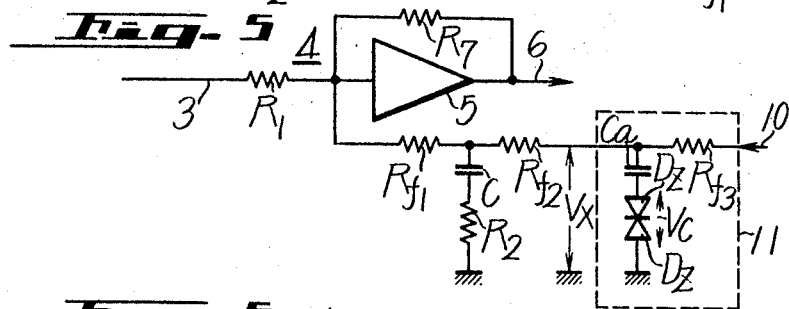

In FIG. 5 there is depicted another modification of this invention, in which the capacitor C and the resistor $R_2$ on the input side of the operational amplifier 5 in the example of FIG. 3 have been incorporated in the feedback loop. The resistor $Rf_1$ is divided into two resistors $Rf_1$ and $Rf_2$ and a series circuit consisting of the capacitor C and the resistor $R_2$ is inserted between the connection point between the resistors $Rf_1$ and $Rf_2$ and ground. The present example is also equivalent to that of FIG. 3. In this case the rate time in the case where $|Vx| < Vc$ and the capacitor Ca is inoperative is the same as that in the example of FIG. 3 except the time constant is defined by $Rf_1Rf_2C(Rf_1 + Rf_2)$. Although this will not be proved for the sake of brevity, it can be readily provided by calculation methods using usual analog computer circuits.

Figure 6:
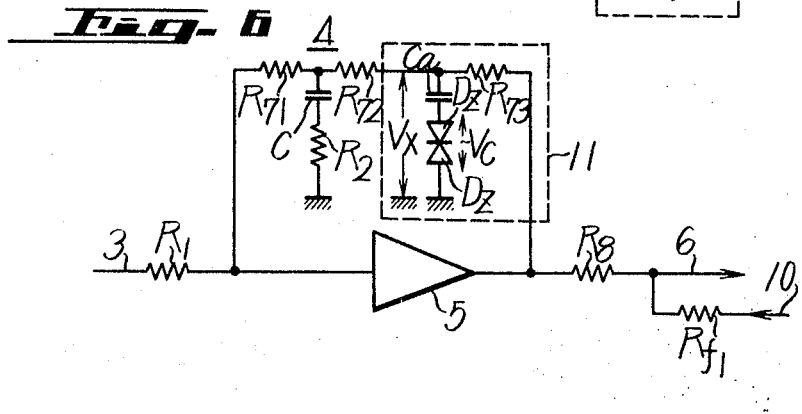

FIG. 6 shows a further example of this invention, in which the rate circuit in the example of FIG. 5 has been mounted in to the feedback loop of the operational amplifier 5. The resistor $R_7$ in FIG. 3 is divided into three resistors $R_{71}$, $R_{72}$ and $R_{73}$ and the series circuit consisting of the capacitor C and the resistor $R_2$ is connected between the connection point of the resistors $R_{71}$ and $R_{72}$ and ground and another series circuit consisting of the capacitor Ca and Zener diodes Dz, Dz is inserted between the connection point of the resistors $R_{72}$ and $R_{73}$ and ground. The other arrangements are substantially the same as those of the circuit of FIG. 3 and this example is also equivalent to that of FIG. 3.

Figure 7:
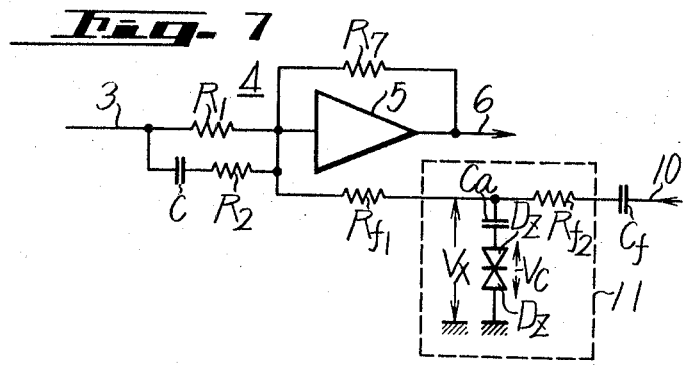

In another modified form of this invention illustrated in FIG. 7 a capacitor Cf is additionally inserted between the resistor $Rf_2$ and the line 10, and non-linear rate operation is achieved in an automatic steering system in which differential, proportional and integral operations are effected.

Figure 8:
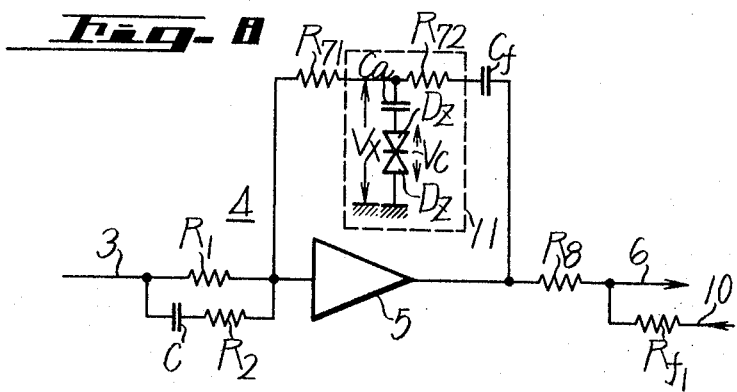

FIG. 8 illustrates still another modification of this invention, in which the capacitor Cf is inserted between the resistors $R_{72}$ and $R_8$ shown in FIG. 4 thereby to achieve a non-linear rate operation in the automatic steering system effecting the differential, proportional and integral operations, as in the example of FIG. 7.

It will be seen from the equations (3) and (4) that the non-linear rate operation can be effectively accomplished and the capacitor Cf in the examples of FIGS. 7 and 8 does not degradate such operation. The reason is that substantial equality of the input terminal voltage of the operational amplifier 5 to zero is independent of the circuit 11 and that the equation (3) is not affected by the presence of the capacitor Cf in connection with the circuit 11. Accordingly, in the examples of FIGS. 7 and 8, the rate time can be made longer when $|Vx|$ exceeds the Zener voltage Vc as in the example of FIG. 3.

The present invention described above resides in the automatic steering system which has the rate time $T_1$ under the condition expressed by the equation (1) and the rate time $T_1 + Ta$ under the condition given by the equation (2).

The foregoing examples employ the operational amplifier 5 but this amplifier may be replaced with any other similar means, so long as the means has high gain. In the embodiments of, for example, FIGS. 3, 5 and 7, if the controller (indicated by 7 in FIG. 2) has incorporated therein a highly sensitive amplifier, it is possible to obtain an automatic steering system in which the operational amplifier 5 is omitted and the point $j$ is connected directly to one input of the amplifier incorporated in the controller 7 but which carries out the same operations as those previously described with FIG. 3.

Figure 9:
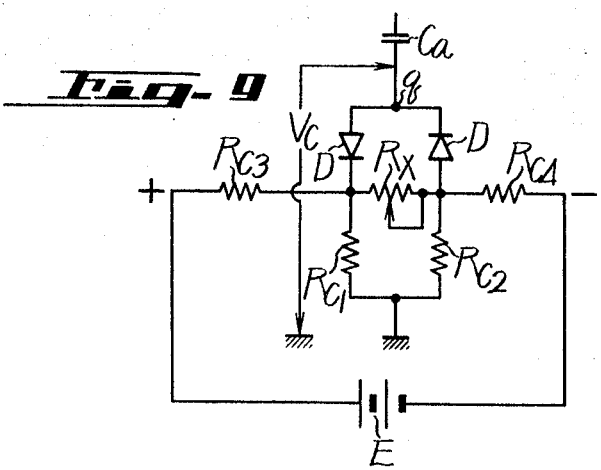
FIG. 9 is a circuit diagram showing a modification of the principal part of the examples of this invention illustrated in FIGS. 3 to 8.

Further, the means for providing the reference voltage Vc is not limited specifically to Zener diodes but may be in the form of any kind of a dead-zone element or circuit. FIG. 9 illustrates one example, in which no Zener diodes are used but instead conventional diodes D are connected in opposition to each other and their connection point q is connected to one electrode of the capacitor Ca and a variable resistor Rx is inserted between the other ends of the diodes D. A series circuit consisting of resistors $Rc_1$ and $Rc_2$ is connected to both ends of the variable resistor Rx and the connection point of the both resistors $Rc_1$ and $Rc_2$ is grounded. A voltage is applied from a DC power source E through suitable resistors $Rc_3$ and $Rc_4$ to both ends of the variable resistor Rx of the circuit connected as above described, thereby to suitably adjust the value of the variable resistor Rx, by which a reference voltage corresponding to the Zener voltage can be obtained as desired.

It will be apparent that many modifications and variations may be effected without departing from the scope of the novel concepts of this invention.

We claim as our invention:

1. An automatic steering system comprising:
a power unit;
a controller for controlling said power unit;
a signal converter for converting the output of said power unit to a corresponding electric signal;
an angular signal generator for generating an electric signal corresponding to the difference between an actual ship's heading and a set course; and
an operational unit for effecting at least proportional and differential operations, said operational unit having a first circuit for providing a first rate time of said differential operation and an amplifier;
the improvement comprising a second circuit consisting of a series circuit of a capacitor and a non-linear element, one end of said series circuit being connected to ground and the other end of said series circuit connected through a resistor to the input terminal of said amplifier of said operational unit, whereby when voltage across said non-linear element exceeds a predetermined voltage, another rate time is obtained because said capacitor of said series circuit is added to said first rate time of said first circuit to automatically increase rate time of said automatic steering system.

2. An automatic steering system as claimed in claim 1 wherein the second circuit is connected to the output side of said signal converter.

3. An automatic steering system as claimed in claim 1 wherein said amplifier has a feedback circuit and said second circuit being connected to said feedback circuit of said amplifier.

4. An automatic steering system as claimed in claim 1 wherein said non-linear element consists of a pair of Zener diodes connected to each other in reverse polarity.

5. An automatic steering system as claimed in claim 1 wherein said non-linear element consists of a pair of diodes, a bias DC electric power source and a variable resistor, whereby the predetermined voltage applied to said pair of diodes is varied.

* * * * *